US010274232B2

(12) United States Patent
Fan et al.

(10) Patent No.: US 10,274,232 B2
(45) Date of Patent: Apr. 30, 2019

(54) CHEMICAL HEAT PUMP WITH MULTI-CHANNEL MEMBRANE REACTOR

(71) Applicant: SOUTH CHINA UNIVERSITY OF TECHNOLOGY, Guangdong (CN)

(72) Inventors: Shuanshi Fan, Guangdong (CN); Wenxiang Zhang, Guangdong (CN); Xuemei Lang, Guangdong (CN); Yanhong Wang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 15/746,426

(22) PCT Filed: Dec. 11, 2016

(86) PCT No.: PCT/CN2016/109358
§ 371 (c)(1),
(2) Date: Jan. 22, 2018

(87) PCT Pub. No.: WO2018/018830
PCT Pub. Date: Feb. 1, 2018

(65) Prior Publication Data
US 2019/0003752 A1    Jan. 3, 2019

(30) Foreign Application Priority Data
Jul. 29, 2016    (CN) .......................... 2016 1 0610635

(51) Int. Cl.
*F25B 30/04*    (2006.01)
*F25B 30/06*    (2006.01)

(52) U.S. Cl.
CPC .............. *F25B 30/04* (2013.01); *F25B 30/06* (2013.01); *Y02B 30/52* (2013.01); *Y02P 80/152* (2015.11)

(58) Field of Classification Search
CPC ......... F25B 30/06; F28D 20/003; Y02B 30/52
See application file for complete search history.

(56) References Cited

U.S. PATENT DOCUMENTS

| 4,701,199 A | * | 10/1987 | Kabe | .................... F25B 29/006 165/104.12 |
| 5,295,358 A | | 3/1994 | Rockenfeller et al. | |

(Continued)

FOREIGN PATENT DOCUMENTS

| CN | 101382358 | 3/2009 |
| CN | 106052196 | 10/2016 |

(Continued)

*Primary Examiner* — Matthew J Merkling
(74) *Attorney, Agent, or Firm* — JCIPRNET

(57) ABSTRACT

The present invention provides a chemical heat pump with a multi-channel membrane reactor, comprising: a feeding pipe, a liquid phase pump, a first solenoid valve, a multi-channel waste heat recovering membrane reactor, a discharging pipe, a remainder reflowing pipe, a heat regenerator, a second solenoid valve, a high-temperature heat release reactor, and a third solenoid valve. The feeding pipe is sequentially connected to the liquid phase pump, the first solenoid valve, and a feeding port of the multi-channel waste heat recovering membrane reactor; and a discharging port of the multi-channel waste heat recovering membrane reactor is sequentially connected to the heat regenerator, the second solenoid valve, the high-temperature heat release reactor and the third solenoid valve via the discharging pipe, and is then connected to the heat regenerator and an inlet of the liquid phase pump, and a remainder reflowing port of the multi-channel waste heat recovering membrane reactor is reconnected to the inlet of the liquid phase pump via the remainder reflowing pipe. According to the present invention, a working medium subjected to the heat absorption reaction of the chemical heat pump is separated through a membrane, such that the heat consumption of a reboiler and the cold (Continued)

consumption of a condenser in a distillation column can be avoided, a sufficient separation is achieved, and the reaction conversion rate and the heat efficiency of a chemical heat pump system can be improved.

5 Claims, 1 Drawing Sheet

(56) References Cited

U.S. PATENT DOCUMENTS

| | | | | |
|---|---|---|---|---|
| 6,605,377 | B1* | 8/2003 | Kimbara | H01M 4/0404 |
| | | | | 429/425 |
| 8,003,073 | B2* | 8/2011 | Pez | C01B 3/22 |
| | | | | 423/644 |
| 8,961,891 | B2* | 2/2015 | Mhadeshwar | B64D 13/08 |
| | | | | 422/129 |
| 2004/0163313 | A1 | 8/2004 | Buxbaum | |
| 2004/0211407 | A1* | 10/2004 | Terashima | F28D 20/003 |
| | | | | 126/400 |
| 2005/0204762 | A1* | 9/2005 | Sasaki | B60H 1/00392 |
| | | | | 62/238.2 |

FOREIGN PATENT DOCUMENTS

| | | |
|---|---|---|
| CN | 205980440 | 2/2017 |
| JP | H0755287 | 3/1995 |

* cited by examiner

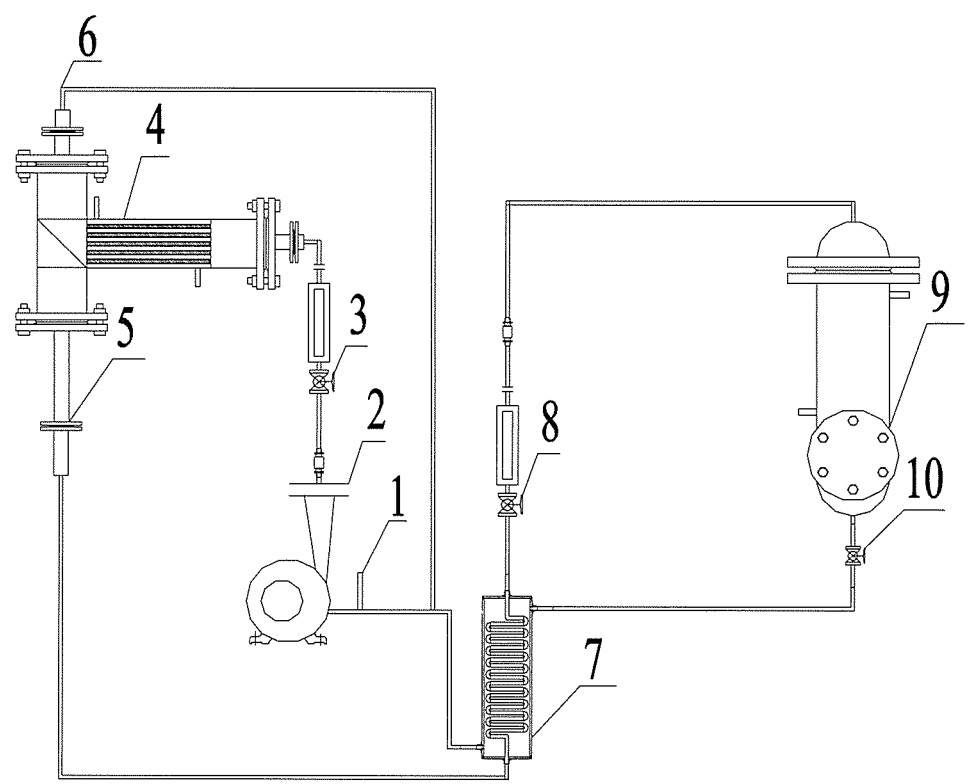

CHEMICAL HEAT PUMP WITH MULTI-CHANNEL MEMBRANE REACTOR

CROSS-REFERENCE TO RELATED APPLICATION

This application is a 371 of international application of PCT application serial no. PCT/CN2016/109358, filed on Dec. 11, 2016, which claims the priority benefit of China application no. 201610610635.2, filed on Jul. 29, 2016. The entirety of each of the above-mentioned patent applications is hereby incorporated by reference herein and made a part of this specification.

TECHNICAL FIELD

The present invention relates to innovative designs of temperature-boost chemical heat pumps, and in particular, relates to a temperature-boost chemical heat pump with a multi-channel membrane reactor which improves quality of waste heat.

BACKGROUND

A heat pump is to absorb heat from the surrounding environment, and transfer the heat to an object to be heated. A chemical heat pump refers to a heat pump that utilizes a chemical phenomenon, and also refers to a heat pump that utilizes a thermo-chemical reaction. The chemical heat pump may be categorized into three types: thermal storage type, heating type, and temperature-boost type. The temperature-boost heat pump improves the quality of the low-quality waste heat, such that the low-quality waste heat between 80° C. and 120° C. is converted into the high-to-medium-quality effective waste heat with a temperature of over 200° C.

At present, a conventional temperature-boost chemical heat pump system generally employs a distillation column to separate the product resulted from a chemical heat absorption reaction from a remainder. However, the separation effect is poor, and energy consumptions of the reboiler at the bottom of the distillation column and the condenser at the top of the distillation column are higher, which accounts for 45% to 65% of the total energy consumption of the temperature-boost chemical heat pump system. Therefore, the temperature-boost chemical heat pump system has a low heat efficiency, which is generally lower than 16%. The chemical reaction in the temperature-boost chemical heat pump system is a reversible reaction. In a heat absorption reactor, since the product resulted from the reaction is not timely separated from the reactant, the conversion rate is low, which is generally 5% to 42%. The non-effective power consumption and heat consumption are relatively higher, which further hinders improvement of the heat efficiency of the temperature-boost chemical heat pump system.

SUMMARY OF THE INVENTION

The present invention is intended to overcome the deficiencies in the prior art, through configuring a multi-channel waste heat absorption membrane reactor in a temperature-boost chemical heat pump system, to achieve a low-power consumption separation of the product of a chemical heat absorption reaction from a non-reacted product, the reaction conversion rate in the reactor and heat efficiency of the temperature-boost chemical heat pump are improved.

Technical solution of the present invention are as follows:

A chemical heat pump with a multi-channel membrane reactor comprises: a feeding pipe, a liquid phase pump, a first solenoid valve, a multi-channel waste heat recovering membrane reactor, a discharging pipe, a remainder reflowing pipe, a heat generator, a second solenoid valve, a high-temperature heat release reactor, and a third solenoid valve; wherein the feeding pipe is sequentially connected to the liquid phase pump, the first solenoid valve, and a feeding port of the multi-channel waste heat recovering membrane reactor; and a discharging port of the multi-channel waste heat recovering membrane reactor is sequentially connected to the heat regenerator, the second solenoid valve, the high-temperature heat release reactor and the third solenoid valve via the discharging pipe, and is then reconnected to the heat regenerator and an inlet of the liquid phase pump, and a remainder reflowing port of the multi-channel waste heat recovering membrane reactor is connected to the inlet of the liquid phase pump via the remainder reflowing pipe.

Further, an observation window is configured on a pipeline between the first solenoid valve and the feeding port of the multi-channel waste heat recovering membrane reactor, and on a pipeline between the second solenoid valve and the high-temperature heat release reactor.

Further, the heat regenerator is an attached heat exchanger, a tube-in-tube heat exchanger or a tube and shell heat exchanger.

Further, the multi-channel waste heat recovering membrane reactor and the high-temperature heat release reactor are both filled with a catalyst.

Further, the catalyst is nickel.

The working principles and processes of the chemical heat pump with the multi-channel membrane reactor according to the present invention are as follows:

a. Heat absorption: Via the feeding pipe, the starting material is pumped by the liquid phase pump, and enters the multi-channel waste heat recovering membrane reactor via the solenoid valve, the industrial low-quality waste heat between 80° C. and 120° C. is absorbed, and a chemical heat absorption reaction is carried out. The chemical heat absorption reaction of the starting material and the separation of the product after reaction and the non-reacted remainder are simultaneously carried out in the multi-channel waste heat recovering membrane reactor, and finally a high-purity product is yielded and flows out through the discharging pipe.

b. Heat release: The heat-absorption chemically decomposed reaction product flowing out from the discharging pipe flows through the heat regenerator, such that the temperature of the liquid is increased, the reaction product then enters the high-temperature heat release reactor via the solenoid valve, and a chemical heat release reaction is carried out at a higher temperature of 200° C. or above such that the low-quality waste heat is converted into a high-quality effective heat.

c. Reflow: After the reaction and the separation via the multi-channel waste heat recovering membrane reactor, the remainder that is incompletely reacted flows out from the remainder reflowing pipe and then pumped by the liquid phase pump. Finally, the remainder reenters the multi-channel waste heat recovering membrane reactor via the solenoid valve to form a reflow.

d. Circulation: The product that is resulted from the chemical reaction in the high-temperature heat release reactor enters the heat regenerator via the solenoid valve, the fluid flowing in the discharging pipe is heated to further improve the heat utilization ratio. Subsequently, the resulted product re-flows to the material feeding port, pumped by the liquid phase pump and then enters the multi-channel waste heat recovering membrane reactor via the solenoid valve. In this way, recirculation is achieved.

The present invention achieves the following beneficial effects:

The device according to the present invention has a simple structure, and by utilizing the membrane for separation, the heat absorption reaction of the chemical heat pump and the separation of the reactant from the reaction product can be carried out simultaneously. With the device, the distillation column device with greater energy consumption is not required, the reaction conversion rate is high, and the system heat efficiency is high. In addition, the device is capable of operating for a long period of time, is economically efficient, and the deficiencies of other temperature-boost chemical heat pumps, such as low conversion rate, low heat efficiency and short operating time are overcome. In the multi-channel waste heat recovering membrane reactor, the starting material absorbs the waste heat and is subjected to a reversible chemical heat absorption reaction to obtain a resulted product, the product is separated from the reactant, and the chemical heat absorption reaction progressively continues. In this way, the conversion rate of the chemical heat absorption reaction is improved. The multi-channel waste heat recovering membrane reactor replaces the distillation column in the conventional temperature-boost chemical heat pump system, in which configuration of a reboiler on the bottom of the distillation column and a condenser on the top of the distillation column is not required. In this way, the system energy consumption is reduced, and the system heat efficiency is improved.

BRIEF DESCRIPTION OF THE DRAWINGS

FIG. 1 is a schematic structural diagram of a chemical heat pump with a multi-channel membrane reactor according to an embodiment of the present invention.

In FIG. 1: 1—a feeding port, 2—a liquid phase pump, 3—a first solenoid valve, 4—a multi-channel waste heat recovering membrane reactor, 5—a discharging pipe, 6—a remainder reflowing pipe, 7—a heat regenerator, 8—a second solenoid valve, 9—a high-temperature heat release reactor, and 10—a third solenoid valve.

DETAILED DESCRIPTION

The objectives of the present invention are further described in detail with reference to the accompanying drawings and specific embodiments. The embodiments are not exhaustively described herein. However, the embodiments of the present invention are not limited to those described hereinafter.

As illustrated in FIG. 1, a chemical heat pump with a multi-channel membrane reactor comprises: a feeding pipe 1, a liquid phase pump 2, a first solenoid valve 3, a multi-channel waste heat recovering membrane reactor 4, a discharging pipe 5, a remainder reflowing pipe 6, a heat regenerator 7, a second solenoid valve 8, a high-temperature heat release reactor 9, and a third solenoid valve 10. The feeding pipe 1 is sequentially connected to the liquid phase pump 2, the first solenoid valve 3, and a feeding port of the multi-channel waste heat recovering membrane reactor 4; and a discharging port of the multi-channel waste heat recovering membrane reactor 4 is sequentially connected to the heat regenerator 7, the second solenoid valve 8, the high-temperature heat release reactor 9 and the third solenoid 10 via the discharging pipe 5, and is then reconnected to the heat regenerator 7 and an inlet of the liquid phase pump 2, and a remainder reflowing port of the multi-channel waste heat recovering membrane reactor 4 is connected to the inlet of the liquid phase pump 2 via the remainder reflowing pipe 6.

Specifically, the feeding pipe 1 is sequentially connected to the liquid phase pump 2, the first solenoid valve 3, the multi-channel waste heat recovering membrane reactor 4, the discharging pipe 5, the heat regenerator 7, the high-temperature heat release reactor 9 and the third solenoid valve 10 to form a chemical heat pump circulation where heat is absorbed at low temperatures and heat is discharged at high temperatures; and the remainder reflowing pipe 6 is sequentially connected to the liquid phase pump 2, the first solenoid valve 3 and the multi-channel waste heat recovering membrane reactor 4 to form a remainder reflowing circulation.

The feeding material of the device is pumped into the multi-channel waste heat recovering membrane reactor 4 by the liquid phase pump 2 and the first solenoid valve 3 via the feeding pipe 1, the industrial waste heat between 80° C. and 120° C. is absorbed, a chemical heat release action is carried out to recover the waste heat, the product after reaction and the remainder that is incompletely reacted are separated via the multi-channel waste heat recovering membrane reactor 4, the product resulted from the reaction enters the heat regenerator 7 via the discharging pipe 5 and then enters the high-temperature heat release reactor 9 via the second solenoid valve 8, and a chemical heat release reaction is carried out at a higher temperature of 200° C. or above such that low-quality waste heat is converted into high-quality effective heat.

The remainder that is incompletely reacted in the multi-channel waste heat recovering membrane reactor 4 enters the remainder reflowing pipe 6, and then reenters the multi-channel waste heat recovering membrane reactor 4 via the liquid phase pump 2 and the first solenoid valve 3 to form a reflow.

The product resulted from the chemical heat release reaction of the material in the high-temperature heat release reactor 9 enters the heat regenerator 7 via the third solenoid valve 10, the material discharged from the discharging pipe 5 is heated, and then enters the multi-channel waste heat recovering membrane reactor 4 via the liquid phase pump 2 and the first solenoid valve 3 to form multiple circulations.

The multi-channel waste heat recovering membrane reactor 4 and the high temperature heat release reactor 9 are both filled with a catalyst.

In this embodiment, when the device chemically absorbs heat, the starting material is pumped by the liquid phase pump 2 via the feeding pipe 1, and enters the multi-channel waste heat recovering membrane reactor 4 via the first solenoid valve 3, the industrial low-quality waste heat between 80° C. and 120° C. is absorbed, and a chemical heat absorption reaction is carried out. The chemical heat absorption reaction of the starting material and the separation of the product after reaction and the non-reacted remainder are simultaneously carried out in the multi-channel waste heat recovering membrane reactor 4, and finally a high-purity product is yielded and flows out through the discharging pipe 5. In this way, a heat absorption process of a temperature-boost chemical heat pump is completed.

When the device chemically releases heat, the heat-absorption chemically decomposed reaction product flowing out from the discharging pipe 5 flows through the heat regenerator 7, such that the temperature of the liquid is increased, the reaction product then enters the high-temperature heat release reactor 9 via the second solenoid valve 8, and a chemical heat release reaction is carried out at a higher temperature of 200° C. or above such that the low-quality waste heat is converted into a high-quality effective heat. In this way, a heat release process of the temperature-boost chemical heat pump is completed.

When the material of the device reflows, after the starting material and the reaction product are reacted and separated via the multi-channel waste heat recovering membrane reactor 4, the remainder that is incompletely reacted flows out from the remainder reflowing pipe 6 and then pumped by the liquid phase pump 2. The remainder reenters the multi-channel waste heat recovering membrane reactor 4 via the first solenoid valve 3 to form a reflow.

When the device cyclically operates, the product that is resulted from the chemical reaction in the high-temperature heat release reactor 9 enters the heat regenerator 7 via the third solenoid valve 10, the fluid flowing in the discharging pipe 5 is heated to further improve the heat utilization ratio. Subsequently, the resulted product re-flows to the feeding port, pumped by the liquid phase pump 2 and then enters the multi-channel waste heat recovering membrane reactor 4 via the first solenoid valve 3. In this way, recirculation is achieved.

In another preferred embodiment of the present invention, most of the devices are manufactured from stainless steel.

In the chemical heat pump system with a multi-channel membrane reactor according to this embodiment, during the initial circulation, the starting material in the feeding pipe 1 is 25° C. liquid isopropanol, having a molar flow rate of 9.56 mol/s. The isopropanol is pumped by the liquid phase pump 2 with an electric power of 73 W, entering the multi-channel waste heat recovering membrane reactor 4 via the first solenoid valve 3 to absorb the 90° C. industrial waste heat, and the isopropanol is gasified to a gas state and is subjected to a heat absorption chemical dehydrogenation reaction at 75° C. with a heat power of 0.98 MW, and gaseous acetone and gaseous hydrogen with a reaction conversation rate of 99%. The product flows out from the discharging pipe 5, and the product is 75° C. acetone and hydrogen, with a molar flow rate of 9.47 mol/s. In this way, chemical heat absorption is achieved.

The product flowing out from the discharging pipe 5 of the device enters the heat regenerator 7, and when the product flows out from the heat regenerator 7, the temperature is raised to 195° C. Then the product enters the high-temperature heat release reactor 9 via the second solenoid valve 8 and is subjected to a chemical heat release reaction, with a heat release power of 0.5 MW, a chemical heat release reaction temperature of 205° C. and a reaction conversion rate of 99%. The fluid flowing out of the high-temperature heat release reactor 9 is isopropanol, acetone and hydrogen with molar flow rates of 9.37 mol/s, 0.09 mol/s and 0.09 mol/s, respectively. The chemical heat pump generates heat at a temperature of 220° C.

The fluid flowing out of the outlet of the high-temperature heat release reactor 9 of the device flows through the third solenoid valve 10 and enters the heat regenerator 7. When the fluid flows out of the outlet of the heat regenerator 7, the temperature of the fluid is changed to 80° C. In this way, the initial circulation is completed, and the heat efficiency is 0.51.

After the initial circulation of the device is completed, the 80° C. fluid flowing out of the outlet of the heat regenerator 7 is pumped again by the liquid phase pump 2, enters the multi-channel waste heat recovering membrane reactor 4 via the first solenoid valve 3 to secondarily absorbs the 90° C. industrial waste heat and is subjected to a chemical heat absorption reaction, with a heat power of 0.51 MW. In this way, multiple circulations are achieved, and the heat efficiency upon the secondary circulation is improved to 0.98.

The multi-channel waste heat recovering membrane reactor 4 of the device employs a U-shaped heat exchanger tube buddle, wherein the surface of the heat exchanger tube buddle is a fin surface, and filled with 10 kg nickel as a catalyst, with a volume of 413 L.

The high-temperature heat release reactor 9 of the device employs a U-shaped heat exchanger tube buddle, wherein the surface of the heat exchanger tube buddle is a fin surface, and filled with 20 kg nickel as a catalyst, with a volume of 100 L.

The heat regenerator 7 of the device employs a U-shaped heat exchanger tube buddle, wherein the surface of the heat exchanger tube bundle is a fin surface, with a volume of 87 L.

It should be understood that the above description of the technical solution according to the present invention in combination of the exemplary embodiments are illustrative instead of limitative, and the specific embodiments of the present invention are not limited to such exemplary embodiments. A person skilled in the art would make various modifications to the technical solution disclosed in the embodiments or make equivalent replacements to some technical features therein without departing from the inventive concept of the present invention. All these modifications and equivalent replacements shall be considered as falling within the protection scope defined by the appended claims of the present invention.

What is claimed is:

1. A chemical heat pump with a multi-channel membrane reactor, comprising: a feeding pipe, a liquid phase pump, a first solenoid valve, a multi-channel waste heat recovering membrane reactor, a discharging pipe, a remainder reflowing pipe, a heat regenerator, a second solenoid valve, a high-temperature heat release reactor, and a third solenoid valve; wherein
the feeding pipe is sequentially connected to the liquid phase pump, the first solenoid valve, and a feeding port of the multi-channel waste heat recovering membrane reactor; and
a discharging port of the multi-channel waste heat recovering membrane reactor is sequentially connected to the heat regenerator, the second solenoid valve, the high-temperature heat release reactor and the third solenoid valve via the discharging pipe, and is then reconnected to the heat regenerator and an inlet of the liquid phase pump, and a remainder reflowing port of the multi-channel waste heat recovering membrane reactor is connected to the inlet of the liquid phase pump via the remainder reflowing pipe.

2. The chemical heat pump with the multi-channel membrane reactor according to claim 1, wherein an observation window is configured on a pipeline between the first solenoid valve and the feeding port of the multi-channel waste heat recovering membrane reactor, and on a pipeline between the second solenoid valve and the high-temperature heat release reactor.

3. The chemical heat pump with the multi-channel membrane reactor according to claim 1, wherein the heat regenerator is an attached heat exchanger, a tube-in-tube heat exchanger or a tube and shell heat exchanger.

4. The chemical heat pump with the multi-channel membrane reactor according to claim 1, wherein the multi-channel waste heat recovering membrane reactor and the high-temperature heat release reactor are both filled with a catalyst.

5. The chemical heat pump with the multi-channel membrane reactor according to claim 4, wherein the catalyst is nickel.

\* \* \* \* \*